(12) United States Patent
Schirmer et al.

(10) Patent No.: US 7,454,414 B2
(45) Date of Patent: Nov. 18, 2008

(54) AUTOMATIC DATA RETRIEVAL SYSTEM BASED ON CONTEXT-TRAVERSAL HISTORY

(75) Inventors: Andrew L. Schirmer, Andover, MA (US); Michael Muller, Medford, MA (US); Vaughn T. Rokosz, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/214,512

(22) Filed: Aug. 30, 2005

(65) Prior Publication Data

US 2007/0061278 A1    Mar. 15, 2007

(51) Int. Cl.
*G06F 17/30* (2006.01)
(52) U.S. Cl. .......................................... 707/3; 707/102
(58) Field of Classification Search ..................... 707/2, 707/3, 102; 715/505
See application file for complete search history.

(56) References Cited

U.S. PATENT DOCUMENTS

| 6,278,966 | B1 | 8/2001 | Howard et al. |
| 6,466,970 | B1 | 10/2002 | Lee et al. |
| 6,633,316 | B1 | 10/2003 | Maddalozzo, Jr. et al. |
| 6,667,751 | B1 | 12/2003 | Wynn et al. |
| 2002/0089532 | A1 | 7/2002 | Cohen et al. |
| 2003/0221163 | A1 | 11/2003 | Glover et al. |
| 2003/0225858 | A1 | 12/2003 | Keohane et al. |
| 2004/0059746 | A1 | 3/2004 | Error et al. |
| 2005/0125715 | A1* | 6/2005 | Di Franco et al. ........... 715/505 |

* cited by examiner

*Primary Examiner*—Etienne P LeRoux
(74) *Attorney, Agent, or Firm*—Guerin & Rodriguez, LLP; Michael Rodriguez

(57) ABSTRACT

A data retrieval system and method provide automatic retrieval of information based on a context-traversal history. A transferable object is identified in a first context while the user is operating in the first context. Information used to retrieve the transferable object is automatically stored without user involvement. The automatically stored information is used to copy the transferable object to an object receptor in a second context while the user operates in the second context.

24 Claims, 6 Drawing Sheets

AUTOMATIC DATA RETRIEVAL SYSTEM BASED ON CONTEXT-TRAVERSAL HISTORY

FIELD OF THE INVENTION

The invention relates generally to computing systems. More specifically, the invention relates to a system and method for automatic retrieval of data and the use thereof based on a history of traversed software contexts.

BACKGROUND

Users of computing devices often need to move or copy information from one software context to another. Text is a simple example of the type of transferred information, although modern computing systems allow the transfer of several types of complex objects, including images, entire database records, and calendar entries, between applications. Sometimes the destination of the transferred information is in a different location within an application, e.g., when copying text from one word processor document to another. Other times the destination is in a different application, e.g., when copying information from a word processor document to a spreadsheet document.

The current, widely used mechanism for implementing information transfers is the clipboard. The clipboard is a temporary storage buffer for storing various types of data, for example, text, graphics, sound, and video. The various application programs on a computing device share the clipboard, that is, data cut or copied to the clipboard from one application program can be copied (i.e., pasted) into another application program from the clipboard.

Use of the clipboard mechanism encounters certain disadvantages. For one, the user must initiate the transfer, i.e., highlight the information to be transferred, perform a copy operation, switch to the destination location, and perform a paste operation. Further, the user often desires the transfer after leaving the source context and switching to the destination context, and only then realizes the importance of making the transfer. Consequently, the user needs to return to the source context to perform the copy operation, only to return once more to the destination context with the copied information in order to effect the paste operation. Moreover, although some clipboard implementations support copying and maintaining multiple objects (i.e., candidates for transfer by way of pasting), the user still needs to select and copy objects one at a time. Thus, there is a need for system and method for retrieving information that can avoid the inconvenience and inefficiency of the present practice described above.

SUMMARY

In one aspect, the invention features a method for retrieving an object associated with a previously traversed context for use in a current context. The method comprises identifying a transferable object in a first context while the user is operating within the first context. Information used to retrieve the transferable object is automatically stored without user involvement. The automatically stored information is accessed in order to copy the transferable object at an object receptor within a second context while the user operates in the second context.

In another aspect, the invention features a system for retrieving information. The system comprises a memory buffer and a processor executing one or more application programs to provide a first and a second context within which the user can operate. A data retrieval program, executable by the processor, (1) identifies a transferable object in the first context while the user is operating in the first context, (2) automatically stores in the memory buffer, without user involvement, information used to retrieve the transferable object, and (3) accesses the information automatically stored in the memory buffer in order to copy the transferable object to an object receptor in the second context while the user operates in the second context.

In still another aspect, the invention features a computer program product for use with a computer system. The computer program product comprises a computer useable medium having embodied therein program code. This program code comprises program code for identifying a transferable object in a first context while the user is operating in the first context, program code for automatically storing, without user involvement, information used to retrieve the transferable object, and program code for accessing the automatically stored information in order to copy the transferable object to an object receptor in a second context while the user operates in the second context.

In yet another aspect, the invention features a computer data signal embodied in a carrier wave for use with a computer system having a display and capable of generating a user interface through which a user may interact with the computer system. The computer data signal comprises program code for identifying a transferable object in a first context while the user is operating in the first context, program code for automatically storing, without user involvement, information used to retrieve the transferable object, and program code for accessing the automatically stored information in order to copy the transferable object to an object receptor in a second context while the user operates in the second context.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
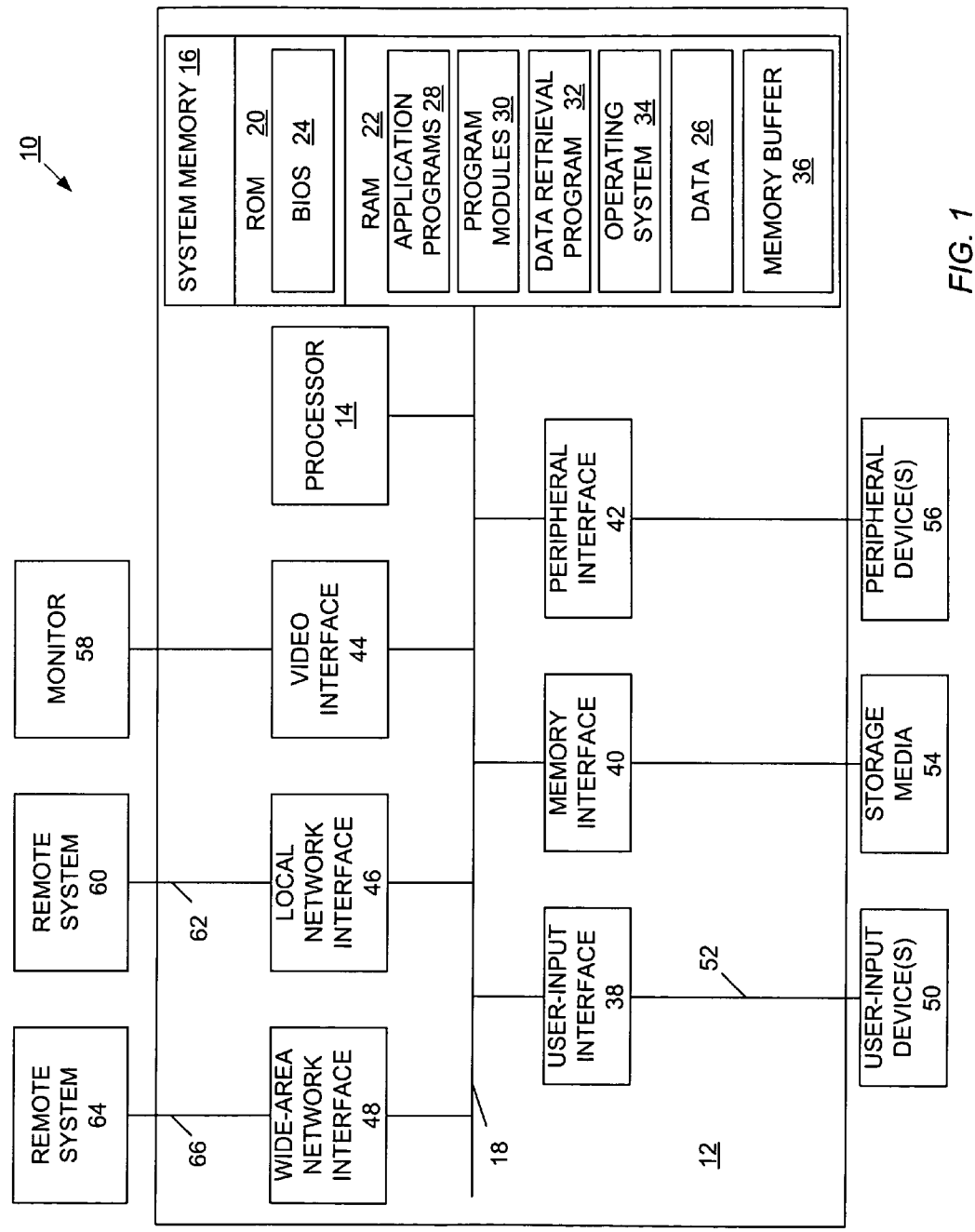
FIG. 1 is a block diagram of an exemplary computing environment in which aspects of the invention may be implemented.

Users of computing systems or devices typically have more than one application program running or more than one window open on their computer screens at any given time. Each of these windows or application programs can represent a different context within which a user operates. Often, the user switches between contexts, for example, by visiting a Web page, then by reviewing a document, followed by reading an email. In addition, the user can change contexts within an application. Examples include, but are not limited to, (1) reading a series of unrelated emails, and (2) processing a series of unrelated cases, claims, or instances within a workflow system. The present invention features a data retrieval system and method for automatically capturing data associated with a previously traversed context and then applying that data to the current context.

In brief overview, while a user operates within a first context, the data retrieval system records information about the transferable objects in that context, referred to hereafter as object information. The capturing of such information generally occurs without the user being aware of the capture. When the user switches to another context, the data retrieval system identifies those object receptors in the new context that are eligible to receive a transferable object identified in the first context. In the new context, the user can initiate a retrieval operation manually and, in some situations, choose which objects to import from the first context to the new context. Additionally, or alternatively, the data retrieval system can transfer objects automatically to the new context. The data retrieval system can also compare transferable objects to each other, whether from the same or from different contexts, to identify commonalities or patterns among the transferable objects, and to bring those commonalities or patterns to the user's attention. The user can then take appropriate action, for example, store related items in a common folder, or create an ascending sequence among a series of increasing or evolving versions of a document.

This description uses sundry examples to illustrate the variety of contexts with which the present invention may operate. Examples of contexts include application programs, graphic windows, documents, pages (e.g., Web pages), and user desktops. The particular embodiment of a context depends upon the particular functionality desired of the data retrieval system.

For example, a context may be associated with different pages generated by the same application program. Consider an application program that generates a form with fields that a user fills with information. The form is representative, for example, of an insurance claim. Upon completing the form, the user submits the information, e.g., to save the supplied information in a file or record. Still, the user may have more claims to submit. The user then proceeds to supply information into a cleared form—still using the same application program—to produce a new claim. The first form represents a first context from which the data retrieval system can automatically capture data, and the latter form represents a new context into which the data retrieval system can import the captured data.

As another example, a context may be all application programs currently executing on the computer system of the user. The data retrieval system automatically records information related to the identities of the executing applications—these identities being the transferable objects of this context. When the user switches to a new context, one in which the identities of the currently executing applications is relevant, the data retrieval system can transfer these identities to the new context, automatically or through user-initiated action.

The data retrieval system can also maintain a history of a user's traversals, with object information associated with objects of different contexts being stored in two or more distinct "historical periods." Each historical period can coincide with a different context through which the user has traversed or with an event that has transpired. The data retrieval system can define an historical period automatically, e.g., whenever the user switches from one context to another, or through user-initiated action, e.g., the user issues a specific command to mark a new historical period.

The stored history preserves a record of the traversals or events of the user, even after the termination of a context, such as closing a window or exiting an application. By default, the data retrieval system can retrieve transferable objects from the most recent historical period for purposes of placing such objects in the current context, although the data retrieval system, or the user, can alter the default behavior to choose a different historical period from which to select transferable objects.

FIG. 1 shows an example of a computing environment 10 within which a data retrieval system of the present invention may be implemented. The computing environment 10 includes a computing device 12 having a processor 14 in communication with system memory 16 over a system bus 18. Exemplary embodiments of the computing device 12 include, but are not limited to, a personal computer (PC), a Macintosh computer, a workstation, a laptop computer, a server system, a hand-held device such as a personal digital assistant (PDA) and a cellular phone, and a network terminal.

The system memory 16 includes non-volatile computer storage media, such as read-only memory (ROM) 20, and volatile computer storage media, such as random-access memory (RAM) 22. Typically stored in the ROM 20 is a basic input/output system (BIOS) 24, which contains program code for controlling basic operations of the computing device 12, including start-up of the computing device and initialization of hardware. Stored within the RAM 22 are program code and data 26. Program code includes, but is not limited to, application programs 28, program modules 30, a data retrieval program 32, and an operating system 34 (e.g., Windows 95, Windows 98, Windows NT 4.0, Windows XP, Windows 2000, and Macintosh).

Application programs 28 on the computing device 12 include, but are not limited to, an electronic mail client program, browser software, an instant messaging program, and office applications, such as spreadsheet, word processor, and slide presentation software. Each application program 28 can be a proprietary or commercially available program, such as Lotus NOTES™ for email, Lotus Same Time™ for instant messaging, Microsoft Internet Explorer™ for browser software, and Microsoft WORD™ for word processing. The browser software can incorporate a JAVA™ virtual machine for interpreting JAVA™ code (i.e., applets, scripts) and applications.

Each application program 28 that participates in the data retrieval system of the present invention can function either as a source of one or more transferable objects, as a destination of one or more transferable objects, or as both. Each application program 28 operating as an object source has an application program interface (API) that enables other programs (e.g., in particular the data retrieval program 32) to access the object and any semantics or metadata related to the object.

Each application program 28 operating as an object destination has an application program interface (API) that enables other programs (e.g., the data retrieval program 32) to identify one or more object receptors for receiving a transferable object and to transfer objects to object receptors. Examples of transferable objects include, but are not limited to, URLs (Uniform Resource Locators) on a page, people objects and references, buddies, current selected text or other content, tables, icons, images (e.g., pictures), email messages, documents, message threads, chats, tasks, workflows, events, and any other object that is identifiable to the supporting application program.

A portion of the RAM 22 serves as a memory buffer 36. The data retrieval program 32 is in communication with the memory buffer 36 to add object information to and remove object information from the memory buffer, as described in more detail below. Object information can be references (i.e., pointers) to transferable objects or copies of the transferable objects themselves. Storing pointers has an advantage over storing object copies in that pointers require less memory.

For a given context, the data retrieval program 32 determines which objects to capture automatically for potential retrieval within a new context. For example, one embodiment of the data retrieval program 32 can interface with an email application program to capture automatically the author, receipt date, and content of an email message that a user is currently reading. When the user switches to a new context, the data retrieval program 32 determines which object receptors in the new context are available to receive automatically captured objects. Object retrieval can occur automatically or under user control. In one embodiment, a user can dynamically define the set of transferable objects (and corresponding object receptors) supported by the data retrieval program 32, thus allowing the data retrieval system to extend dynamically to new objects. In addition, one or more of the application programs 28 that cooperate with the data retrieval program 32 can include built-in functionality for performing object retrieval, as described in more detail below.

The system bus 18 connects the processor 14 to various other components of the computing device 12, including a user-input interface 38, a memory interface 40, a peripheral interface 42, a video interface 44, a local network interface 46, and a wide-area network interface 48. Exemplary implementations of the system bus 18 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over a wire or wireless link 52, the user-input interface 38 is in communication with one or more user-input devices 50, e.g., a keyboard, a mouse, trackball, touch-pad, touch-screen, microphone, joystick, by which a user can enter information and commands into the computing device 12. The memory interface 40 is in communication with removable and non-removable non-volatile storage media 54. Examples of removable and non-removable non-volatile storage media include, but are not limited to, hard disks, optical disks such as CD ROMs, magnetic diskettes, and flash memory cards. Peripheral devices 56, e.g., printers, speakers, scanners, connect to the system bus 18 through the peripheral interface 42 and a display monitor 58 connects to the system bus 18 through the video interface 44.

The computing device 12 can be part of a network environment. Examples of network environments include, but are not limited to local-area networks (LAN), metro-area networks (MAN), and wide-area networks (WAN), such as the Internet or World Wide Web. For connecting to a remote system 60 on a IAN, the computing device 12 can use the local network interface 46 over a logical connection 62. To connect to a remote system 64 on a WAN, the computing device 12 can use the wide-area network interface 48 over a logical connection 66. Examples of remote systems 60, 64 include, but are not limited to, Web servers, e-mail servers, application servers, directory servers, instant messaging servers, routers, and personal computers. The computing device 12 can connect to the remote system 60, 64 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Figure 2A:
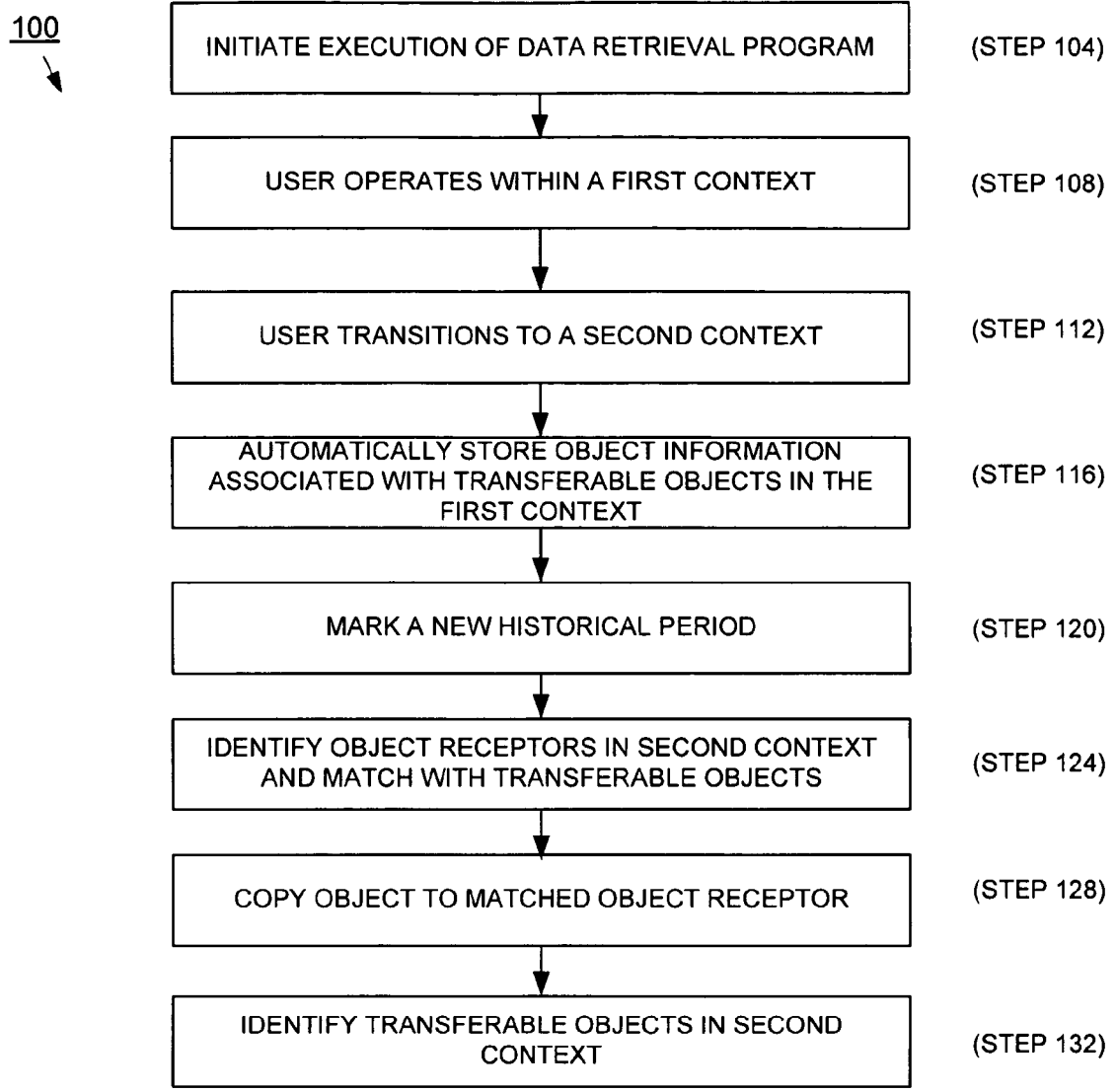
FIG. 2A is a flow diagram of an embodiment of a process for retrieving and applying data based on a context-traversal history.

FIG. 2A shows an embodiment of a process 100 for retrieving an object within a current context based on object information automatically stored in the memory buffer 36 during a previous traversal of one or more other contexts. In describing the process 100, reference is also made to FIG. 1. The order of steps is exemplary; it is to be understood that one or more of the steps can occur in a different order than that shown.

At step 104, the processor 14 (FIG. 1) starts execution of the data retrieval program 32. Configuration of the computing device 12 can cause the data retrieval program 32 to start executing when the computing device 12 starts up. Alternatively, a user can deliberately launch the data retrieval program 32 at any time after start-up (e.g., during execution of an application program 28). The data retrieval program 32 can run as a background process, unseen by a user of the computing device 12, or in the foreground (e.g., visible and presenting the user with a user interface).

At step 108, a user works within a first context. While the user is operating in the first context, the data retrieval program 32 identifies those transferable objects present. At step 112, the user leaves the first context and enters a second context. At step 116, the data retrieval program 32 automatically stores object information (e.g., references) in the memory buffer 36, for each transferable object identified in the first context. In one embodiment, the data retrieval program 32 copies enough information about each object to resolve and copy that object if needed in the second context. This object information includes semantics, metadata, or both, that enables the object to participate in the transfer process. For example, a given application program may produce a form with fields for receiving text entry from a user. One of the fields is for receiving a name. The transferable object is the text that the user enters into this field and the metadata identifies this particular field as a "Name" field. The storing of the object information occurs without any user intervention. As an optimization of performance, the object information can be pre-cached before the user leaves the first context. However, waiting until the moment the user leaves the first context before storing the object information ensures that the data (e.g., user-supplied text) associated with an object is current.

At step 120, the data retrieval program 32 uses the user's transition from the first context to the second context to delineate a new historical period automatically. The data retrieval program 32 records each distinct historical period in the memory buffer 36 and thus associates object information with historical periods.

In one embodiment, the user has the ability to define the beginning of a new historical period. By executing a command, the user can establish a new boundary between the previous historical period and the current historical period. The user can name the new historical period to enable unambiguous indexing into the history of the context traversal. This user capability can exist in lieu of or in conjunction with automatically generated historical periods.

At step 124, the data retrieval program 32 identifies the set of object receptors in the second context and attempts to match each of the transferable objects captured from the first context with the object receptors in the second context. In effect, each object receptor represents criteria that determine whether object retrieval may occur in the second context. For example, metadata associated with an object receptor can indicate that the object receptor corresponds to a "Name" field within the second context and, thus, that the object receptor accepts only transferable objects taken from "Name" fields. The data retrieval program 32 defines which transferable objects match which types of object receptors.

At step 128, the data retrieval program 32 copies a transferable object in the first context into a matching object receptor in the second context. Depending upon the number of transferable objects and object receptors, the transfer of multiple objects from the first context to the second context can occur within a single retrieval operation. Object retrieval may occur without any intervention or indication of intent on the part of the user.

For example, in one embodiment, if there is only one matching object for a given object receptor, object retrieval occurs automatically. That is, the data retrieval program 32 uses the corresponding stored object information to retrieve the transferable object from the first context and place that object within the second context. In another embodiment, upon finding a matching object for a given object receptor, the data retrieval program 32 presents a user interface (e.g., a menu) to inform the user of the availability of retrievable information. A separate menu can be associated with each object receptor, or a single menu can control all object transfers to the second context. In effect, the data retrieval program 32 alerts the user of advantageous data transfers that might otherwise go unrecognized.

If multiple matching object receptors are available for a given transferable object, in one embodiment the data retrieval program 32 can present an appropriate user interface to mediate the decision of the user regarding which object receptor obtains the object. One option is for the user to select more than one of these multiple object receptors for obtaining a copy of the object.

If multiple matching objects of the same type are available for a given object receptor, the data retrieval program 32 can (a) use by default the most recently visited object from the most recent historical period, (b) use, on an exception basis, an earlier object (of the same type) from an older historical period, (c) set an older historical period as the default, or (d) present a menu of the matching objects to mediate the decision of the user regarding which object the object receptor receives.

When object retrieval is appropriate, whether such retrieval occurs automatically or manually, the data retrieval program 32 uses the object information in the memory buffer 36 to retrieve the object from the source context. Object information can remain in the memory buffer 36 for one context transfer only or for multiple context transfers, depending on the designer's choice of user experience and the computer system resources available. This retrieve operation differs from a conventional copy-and-paste operation because the object retrieval occurs from a historical record of the user's past activities and traversals, and not from a copy-paste buffer. Also, object retrieval does not interfere with the operation of the clipboard or with data placed in the clipboard.

At step 132, if the second context is also a source of transferable objects, the data retrieval program 32 identifies and records transferable objects of the second context as described above in steps 108 and 116. These transferable objects become part of the current historical period. In complex or long-term sessions, a user may accumulate multiple sets of objects in the memory buffer 32. For example, in some applications, such as claims processing or customer care centers, a user can perform the same sequence of traversals (pages, documents) repeatedly, for each work item of a series of work items. The memory buffer 36 stores the history of the user's page location, or document traversals as a series of segments or historical periods, with each set of objects belonging to one particular historical period. Within the current context, object retrieval occurs from the most recent, previous historical period by default. In one embodiment, the user can access objects from an earlier historical period on an exception basis, or reset the default to an earlier historical period.

Figure 2B:
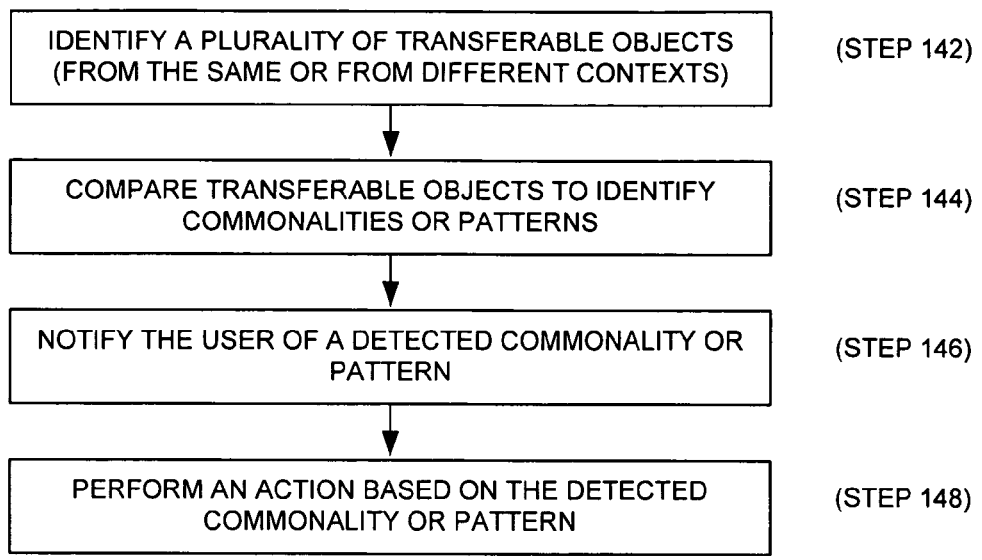
FIG. 2B is a flow diagram of an embodiment of a process for deriving knowledge from the transferable objects captured during context traversals.

FIG. 2B shows an embodiment of a process 140 for deriving knowledge from the transferable objects captured during the context traversals of the user. In brief overview, by comparing objects taken from the same or different contexts, knowledge can be derived about the various relationships between the contexts and objects therein. Contextual comparisons can accumulate across multiple contexts, revealing patterns.

More specifically, the data retrieval program 32 identifies (step 142) a plurality of transferable objects. These transferable objects may be associated with the same context or with two or more different contexts. The data retrieval program 32 compares (step 144) the transferable objects with each other to look for commonalities or patterns. For example, a user may review 30 customer trouble reports (within a single context), and the data retrieval program 32 may detect (from associated objects) that 20 of the 30 reports are associated with a particular field service office. As another example, a user may review ten different documents, tasks, and activities (across multiple contexts), and the data retrieval program 32 may detect that three of such items have the same due date. These two examples illustrate transferable objects that have common attributes (i.e., field service office, due dates) and common attribute values (i.e., 20 of 30 with the same field service office, 3 of 10 with the same due date).

The data retrieval program 32 can also be configured to detect transferable objects with related attributes and attribute values (i.e., the attributes or attribute values of the transferable objects are not the same, but taken together illustrate a relationship, pattern, or trend). For example, the data retrieval program 32 can detect sequential patterns, e.g., customer reports dated yesterday, today, and tomorrow, or trends, e.g., one network outage, two network outages, then four, eight, and sixteen network outages. Other detectable relationships include, but are not limited to, parts of a whole (Kelly is a member of the Rapid City office, whose other members include Sean and Dale), and components of sub-processes (e.g., the user reviews a presentation by Blair which is included in a project plan as part of the "prepare for customer meeting" step).

Upon detecting a commonality or pattern, the data retrieval program 32 can alert (step 146) the user, e.g., by displaying a graphical dialog box, to provide an opportunity for the user to take (step 148) an appropriate action, such as storing the related items in a project, folder, or activity. Alternatively, the data retrieval program 32 can automatically perform a store operation (for example) based on the detected commonality or pattern.

Figure 3A:
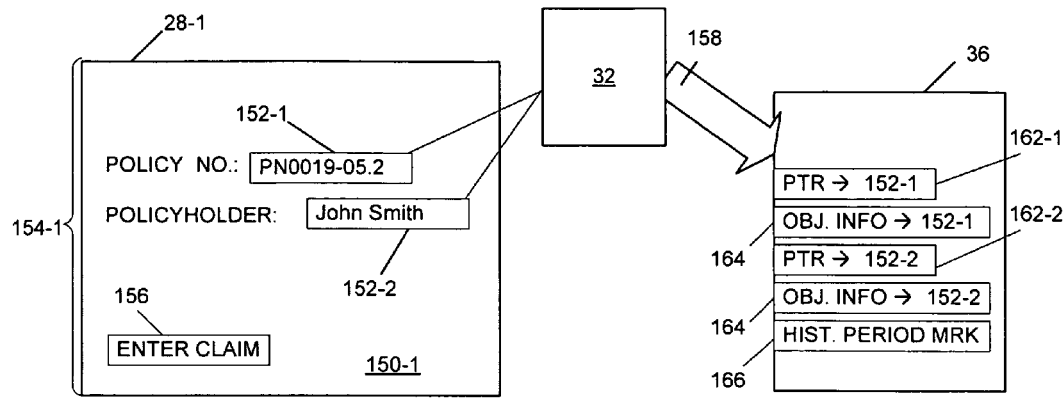
FIG. 3A is a block diagram illustrating an exemplary implementation of a process for automatically capturing transferable objects from a source context.
Figure 3B:
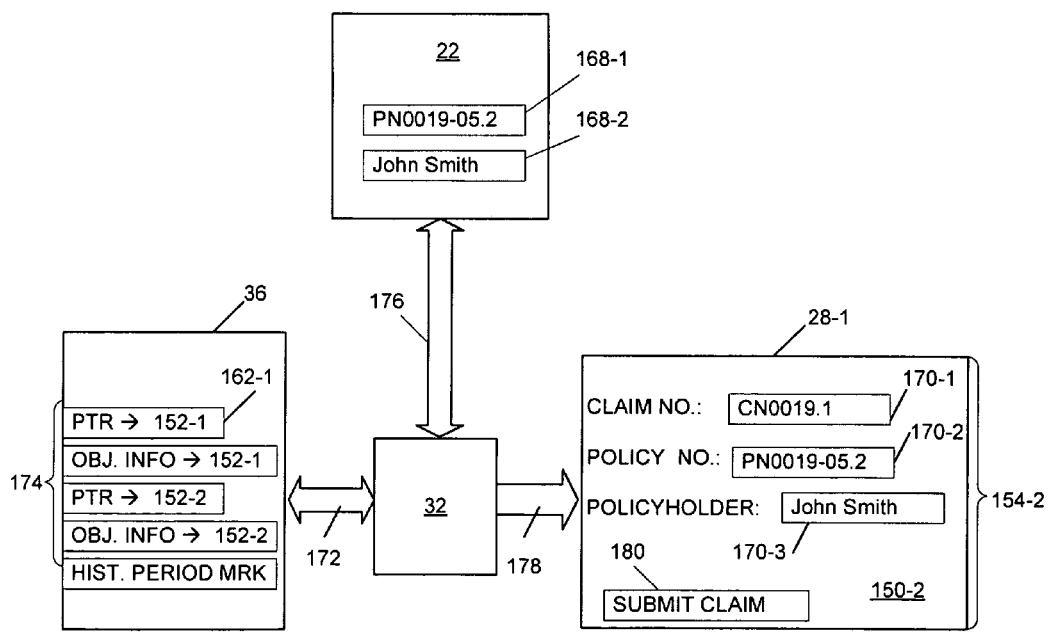
FIG. 3B is a block diagram illustrating an exemplary implementation of a process for retrieving the transferable objects captured from the source context and applying such objects based to a destination context.
Figure 3C:
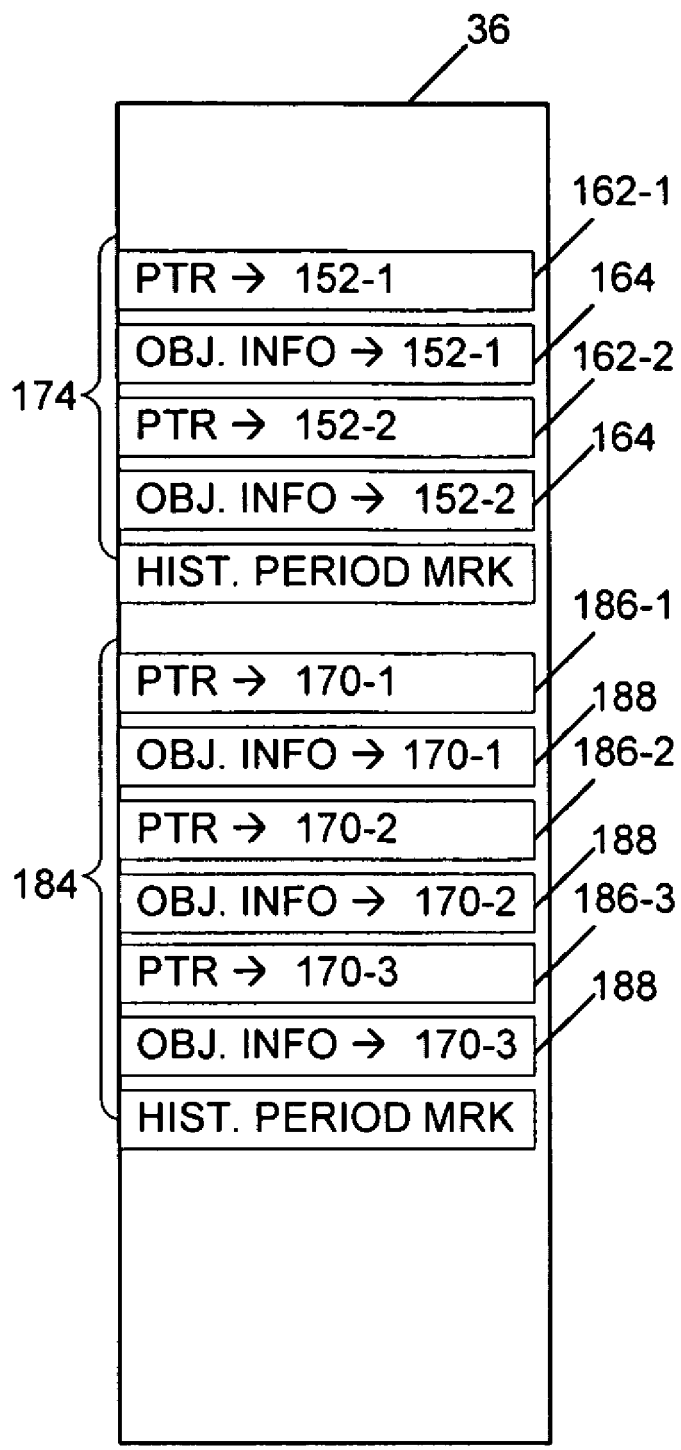
FIG. 3C is a block diagram of an embodiment of a memory buffer within which is a recording of the context-traversal history illustrated by FIGS. 3A and 3B.

FIGS. 3A-3C illustrate an operation of the data retrieval system of the invention by example. Referring to FIG. 3A, the user is running an application program 28-1 for processing insurance claims. During the process of submitting a claim of a policyholder, the application program displays a form 150-1 on the display monitor of a computing device. The form 150-1 includes various fields 152-1, 152-2 (generally, field 152) containing text information. One field 152-1 holds a policy number (e.g., PN0019-05.2) and another field 152-2 holds the name of the policyholder (e.g., John Smith). In this example, the fields 152-1, 152-2 correspond to transferable objects, that is, the data retrieval program 32 can transfer the information contained in each field 152 to a new context, as described herein. The form 150-1, fields 152, and transferable objects correspond to a first context 154-1 within which the user is operating.

Consider that the form 150-1 also has a graphical button 156 for entering an insurance claim. When the user depresses the button 156, the application program 28-1 presents the user with a new form 150-2 (FIG. 3B). In addition, the data retrieval program 32 automatically stores in the memory buffer 36, as indicated by arrow 158, a reference or pointer 162-1, 162-2 for each field 152-1, 152-2 and object information 164 related to that field 152. (The pointers 162-1, 162-2 refer to respective locations 168-1, 168-2 (FIG. 3B) in memory 22 where the application program 28-1 stored the objects during its execution. Storage of these objects persists after a switch to a new context, and may or may not persist after the application program 28-1 terminates, depending upon the desired functionality of the data retrieval system). The data retrieval program 32 can also automatically insert a historical period marker 166 to mark the end of one historical period and the start of another.

Referring now to FIG. 3B, after pressing the "enter claim" button 156, the user begins operating within a second context 154-2 comprised of the form 150-2, fields 170-1, 170-2, and 170-3, and associated objects. In the second context, the data retriever program 32 determines whether the form 150-2 has any associated object receptors. In this example, fields 170-2 and 170-3 correspond to object receptors; field 170-2 accepts a policy number and field 170-3 accepts the name of a policyholder.

The data retriever program 32 also accesses (arrow 172) the memory buffer 36 to determine which transferable objects are available for transfer to the second context. In one embodiment, the data retriever program 32 uses, by default, objects and object information associated with the most recent historical period 174. From the object information associated with each of the various transferable objects, the data retriever program 32 can determine whether that object is of suitable type for the object receptor (e.g., a policy number object is suitable for a policy number object receptor). Upon finding a match between an object and an object receptor, the data retriever program 32 can automatically copy the object to the object receptor or display a graphical user interface to solicit user interaction.

To copy an object to the second context, the data retriever program 32 uses the appropriate pointer stored in the memory buffer 36 to access (arrow 176) the object stored in memory 22 and copy (arrow 178) that object to the appropriate object receptor in the second context. For example, the data retriever program 132 uses the pointer 162-1 to obtain and copy the policy number object stored at memory location 168-1 into field 170-2 and the pointer 162-2 to obtain and copy the policyholder object stored at memory location 168-2 into field 170-3. Accordingly, the data retriever system 32 enables the user to take objects of the first context 154-1 into the second context 154-2 upon transitioning to the second context, without having to copy such objects deliberately (i.e., to the clipboard) or having to return to the first context in order to copy those objects.

Consider that the form 150-2 also has a graphical button 180 for submitting a completed insurance claim. When the user activates this button 180, the application program 28-1 can present the user with a new form (not shown), which would correspond to a new context. In addition, the data retrieval program 32 automatically stores in the memory buffer 36 a pointer for each field 170-1, 170-2, 170-3, provided each are determined to hold transferable objects, and object information related to that field. The data retrieval program 32 can also automatically insert another historical period marker into the memory buffer to mark the end of the second historical period and the start of a third.

FIG. 3C illustrates an exemplary recording, in the memory buffer 36, of the history of the user's context traversals. Continuing with the example of FIGS. 3A and 3B, when the user presses the "submit claim" button 180, the memory buffer 36 can then comprise two historical periods 174 and 184. The contents of historical period 174 include the pointers 162-1, 162-2 and object information 164 associated with the transferable objects of form 150-1; and the historical period 184 includes pointer 186-1, 186-2, and 186-3 and related object information 188 associated with the transferable objects (here, e.g., respective fields 170-1, 170-2, and 170-3) of form 150-2.

From within the application program 28-1, the user may have access to the history of context traversals. To the user, this history can appear as a list of historical periods. Each historical period can bear a user-supplied title to facilitate user-recognition of the context with which that historical period corresponds. The user may be able to select one of the historical periods in the list in order to return to the corresponding context or to select that historical period as a default historical period from which transferable objects are to be obtained.

Figure 4:
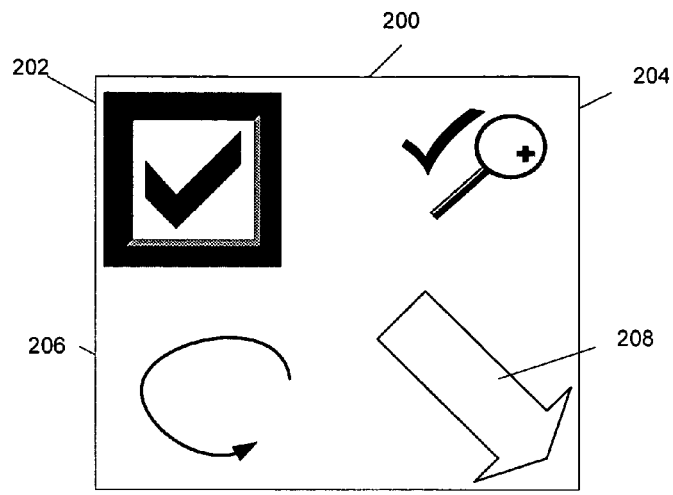
FIG. 4 is an illustration of a menu-based icon that can operate to provide a computing-system user with a mechanism to perform data retrievals manually within a destination context.
Figure 5:
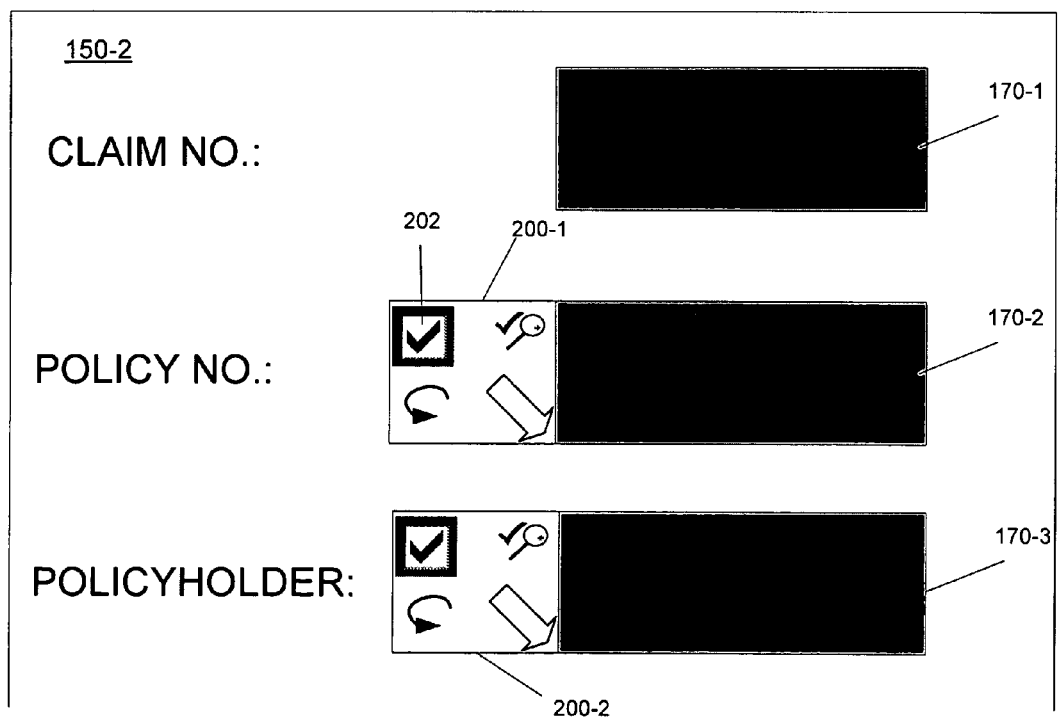
FIG. 5 is an illustration of an exemplary use of the menu-based icon of FIG. 4 with different object receptors in the destination context of FIG. 3B.

FIG. 4 shows an embodiment of a graphical user interface 200 that can be displayed to solicit user interaction. For example, the data retrieval program 32 can include the functionality that displays the interface 200. Alternatively, the program code that produces the current context, such as an application program 28, can have built-in functionality for displaying the graphical user interface 200, and for implementing the various operations that the graphical user interface 200 enables, as described below. In general, an interface, such as graphical user interface 200, can be associated with each object receptor in the current context. For example, the fields 170-2, 170-3 in the second context 154-2 of FIG. 3B each have a graphical user interface 200-1, 200-2, respectively, as shown in FIG. 5. In this example, the field 170-1, which is associated with a claim number, does not have a graphical user interface because it is not an object receptor.

The interface 200 includes four regions 202, 204, 206, 208. Each region corresponds to a different action that the user can perform. One region 202, referred to as a queue region, allows the user to select the associated object receptor and other object receptors in the same context as a group. A retrieve operation then occurs once for the entire group of object receptors. A second region 204 of the graphical user interface 200, referred to as a recall region, allows the user to obtain a menu of objects that can be transferred to the associated object receptor and to choose an object from the menu for retrieval. A third region 206 allows the user to undo a retrieval operation and a fourth region 208 allows the user to invoke the data retrieval program 32 to retrieve the default object for the associated object receptor.

In the example described in FIGS. 3A-3C, a single application program 28-1 produced the first and second contexts with which the data retrieval system operates. The following example illustrates the operation of the data retrieval system when different application programs provide the first and second contexts. Consider that a user has been looking at a conversation thread in an e-mail message (a first context provided by a first application program). The conversation thread reminds the user of a discussion in a workspace shared with team members. The user goes to the workspace (a second context provided by a second application program) to review the discussion and decides the email thread is relevant, and wants to add the email thread to the shared discussion. Without needing to return to the email message, the user simply chooses "Retrieve" from within the workspace (the workspace application being programmed with the capability of initiating object retrieval). The data retrieval system presents a list of objects automatically brought along from the previous e-mail context, including the e-mail thread and its participants (the data retrieval program being programmed to capture such information automatically). The user adds the email thread to the discussion list, and its participants as members of the team workspace.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method for retrieving an object associated with a previously traversed context for use in a current context, the method comprising:
    identifying a transferable object in a first context while the user is operating in the first context;
    automatically storing in memory, without user involvement, information used to retrieve the transferable object;
    accessing the automatically stored information in order to copy the transferable object to an object receptor in a second context while the user operates in the second context; and
    storing a marker in the memory to signify an end of a first historical period associated with the first context and a start of a second historical period associated with the second context, to associate the transferable object identified in the first context with the first historical period, and to separate the information automatically stored in the memory in the first historical period from information automatically stored in the memory in the second historical period, thereby recording a history of context traversals by the user that includes a traversal from the first context to the second context.

2. The method of claim 1, wherein the automatically storing in memory, without user involvement, of information used to retrieve the transferable object occurs in response to the user transitioning from the first context to the second context.

3. The method of claim 1, further comprising automatically copying the transferable object to the object receptor in the second context.

4. The method of claim 1, further comprising notifying the user, while the user is operating in the second context, that the transferable object is available for retrieval so that the user can manually initiate copying the transferable object to the object receptor in the second context.

5. The method of claim 1, wherein the transferable object is a first transferable object, and further comprising:
    identifying a second transferable object in the first context; and
    notifying the user that the first and second transferable objects are each are available for the object receptor so that the user can select which one of the transferable objects to retrieve.

6. The method of claim 1, wherein the transferable object is a first transferable object, and further comprising:
    identifying a second transferable object;
    comparing the first and second transferable objects; and
    notifying the user of a detected relationship between the transferable objects based on the comparison.

7. The method of claim 6, wherein the first and second transferable objects are from different contexts.

8. The method of claim 6, wherein comparing the first and second transferable objects comprises identifying an attribute value that is common to the first and second transferable objects.

9. The method of claim 6, wherein comparing the first and second transferable objects comprises identifying an attribute that increases in value from the first transferable object to the second transferable object.

10. The method of claim 1, wherein the object receptor is a first object receptor, and further comprising:
    identifying a second object receptor in the second context; and
    notifying the user that the first and second object receptors are eligible for receiving a copy of the transferable object so that the user can choose which object receptor receives the transferable object.

11. The method of claim 1, wherein the transferable object is a first transferable object and the object receptor is a first object receptor, and further comprising:
    identifying a second transferable object in the first context while the user is operating within the first context;
    automatically storing, without user involvement, information used to retrieve the second transferable object; and
    copying the second transferable object at the second object receptor in the second context during the same retrieve operation in which the first transferable object is copied at the first object receptor in the second context.

12. The method of claim 1, further comprising preserving the recorded history of context traversals after the user terminates the first and second contexts.

13. The method of claim 1, further comprising selecting one of the historical periods as a default historical period from which to copy transferable objects into a current context.

14. The method of claim 1, wherein storing the marker in the memory occurs automatically in response to a transition of the user from the first context to the second context.

15. The method of claim 1, wherein storing the marker in the memory occurs in response to a user-executed command.

16. The method of claim 1, further comprising giving by the user a name to each historical period to enable indexing into the recorded history of the context traversals.

17. The method of claim 1, further comprising selecting by the user a historical period that is recorded in the memory before the first historical period as a default period from which to copy a transferable object to an object receptor in the second context.

18. The method of claim 1, further comprising displaying the recorded history of context traversals as a list of historical periods each having a user-supplied title.

19. The method of claim 18, wherein each historical period corresponds to a context, and further comprising selecting by the user one of the historical periods in the list to return the user to the context corresponding to that selected historical period.

20. The method of claim 1, further comprising associating a graphical user interface with the object receptor in the second context through which the user can execute one or more operations related to copying a transferable object to the object receptor.

21. The method of claim 1, wherein the first context is provided by executing a first application program and the second context is provided by executing a second application program different from the first application program.

22. The method of claim 1, wherein the first context includes a first Web page and a second context includes a second Web page different from the first Web page.

23. The method of claim 1, wherein the transferable object includes an email message.

24. The message of claim 1, wherein the first context includes an email message.

* * * * *